United States Patent [19]
Kuhn et al.

[11] 3,782,486
[45] Jan. 1, 1974

[54] MEASURING TRANSIENT LOADS

[75] Inventors: Stephanus Hendrik Kuhn; Charles Richard Freeme, both of Everhardus; Rombout Beulink; John Edgar Baron Basson, both of Transvaal, all of South Africa

[73] Assignee: South African Inventions Development Corporation

[22] Filed: May 12, 1971

[21] Appl. No.: 142,717

Related U.S. Application Data
[63] Continuation-in-part of Ser. No. 846,909, Aug. 1, 1969, abandoned.

[30] Foreign Application Priority Data
Aug. 1, 1968 South Africa.................... 68/4975
Mar. 14, 1969 South Africa.................... 69/1840

[52] U.S. Cl................ 177/210, 73/141 A, 317/246
[51] Int. Cl.............................................. G01g 3/14
[58] Field of Search.......................... 177/210, 126; 73/141 R, 141 A, 242; 317/246, 249 R, 249 D, 249 T, 261

[56] References Cited
UNITED STATES PATENTS
3,177,967  4/1965  Wilson........................ 317/246 X
2,939,059  5/1960  Gravley............................... 317/242
2,614,416  10/1952  Hollmann......................... 73/141 A
2,649,579  8/1953  Alexander..................... 317/246 UX
2,965,877  12/1960  Stein et al....................... 317/246 X FOREIGN PATENTS OR APPLICATIONS
1,177,159  4/1959  France............................. 73/141 A Primary Examiner—Richard B. Wilkinson
Assistant Examiner—George H. Miller, Jr.
Attorney—Sughrue, Rothwell, Mion, Zinn & Macpeak

[57] ABSTRACT

A device for sensing and measuring a transient load, such as a load imposed by at least one wheel on an axle of a passing vehicle, comprising a flexible and resilient mat formed of a dielectric and elastomeric material and adapted to be engaged by the load, and at least two vertically spaced capacitor electrodes embedded in and extending over substantially the entire operative area of the mat. The electrodes are connected to a device for detecting variations in the electrode spacing owing to transient loads. Void areas are located in the body of the mat to provide for mat deformation that is linearly proportional to the magnitude of the applied load. Preferably, the void areas are uniformly distributed in the mat and extend substantially from one of the electrodes to the other electrode.

7 Claims, 3 Drawing Figures

PATENTED JAN 1 1974                 3,782,486

3,782,486

MEASURING TRANSIENT LOADS

CROSS REFERENCE TO RELATED APPLICATION

The application is a continuation-in-part of application Ser. No. 846,909 filed Aug. 1, 1969 and entitled "MEASURING TRANSIENT LOADS," now abandoned.

BACKGROUND OF THE INVENTION

This invention relates to devices for measuring transient and static loads. The invention is particularly concerned with measuring axle weights of vehicles passing over a road surface.

Several methods are known for measuring axle weights most of which, at least in the knowledge of the applicant, require structural adaptation of the road surface. For instance, in one arrangement massive reinforced concrete slabs are supported flush with a road surface by strategically located cells placed in a trench excavated in the road surface. Electrical signals pass from these cells as transient loads are imposed on the concrete slabs. The obvious drawback here is the need for interfering with the road surface and the relative difficulty of replacing load cells.

Thereafter, portable dynamic weigh bridges were developed but they still required the removal of sections of a road surface. These portable units also required a mobile laboratory for the instrumentation.

In one portable arrangement, the change in the capacitance in a capacitor due to altered spacing of the capacitor plates arising on the passage of a load is used as a measure of the axle load imposed on the device. On the passage of the load the datum spacing of the capacitor plates is re-established by spring or other suitable means. Clearly a device of this nature involves the use of mechanical contrivances, fatigue of which can materially alter the performance of the sensing mat.

SUMMARY OF THE INVENTION

In any event existing devices are not entirely satisfactory, at least in the experience of the applicant, and an object of the present invention is the provision of a weight sensing device having the following characteristics:
a. portability both in respect of completeness and ease,
b. simplicity in installation,
c. ruggedness and reliability,
d. insensitivity to location of load otherwise than in the contact position,
e. cheapness.

According to the invention, a device for sensing and measuring a transient load imposed by at least one wheel on an axle of a passing vehicle, comprises:
a resiliently flexible mat formed of a dielectric and elastomeric material and adapted to be engaged by the wheel,
at least two vertically spaced capacitor electrodes embedded in and extending over substantially the entire operative area of the mat,
means for connecting the electrodes to a device for detecting variations in the electrode spacing due to transient loads, and
void areas located in the body of the mat to provide for mat deformation that is linearly proportional to the magnitude of an applied load, the void areas being uniformly distributed in the mat and extending at least substantially from one of said electrodes to the other.

Further, according to the invention, the void areas are in the nature of substantially parallel spaced passages passing through the mat with their principal axes adapted to lie in parallelism with an underlying road surface.

Preferably, the passages are straight ducts passing through the mat in a substantially lengthwise direction.

Also, according to the invention, the electrode arrangement includes a base electrode, a central electrode and an overlying electrode, the electrodes being adapted for disposition in vertically spaced relationship relative to each other and the base and overlying electrodes being coupled and adapted for earth connection, thereby to shield the central electrode. Preferably, the overlying electrode includes an element of conducting material having a resiliently flexible character.

Provision is also made in the unit of the invention for switch means operable by the load to trigger the device into operation. With this arrangement it is envisaged that under no-load conditions the unit will be switched off but on engagement of the switch means by the load the unit is brought into action. On the passage of the load, the device is automatically deactivated.

The invention is also directed to a method of manufacturing the mat of the device which is characterized in the development of the mat about void formers which may be pulled clear of the mat when the latter element has been developed.

In claiming that the spaced capacitor electrodes are embedded in the mat the applicants intend to cover those circumstances in which the entire mat is of elastomeric and dielectric material and those cases where the dielectric and elastomeric mat is itself sandwiched between exposed protective layers of material of properties possibly differing from those of the mat. In these latter circumstances, some of the electrodes may in fact be located at the interface of the layers while still being essentially embedded in the mat taken as including all the layers.

BRIEF DESCRIPTION OF THE DRAWING

To illustrate the invention, an example is described hereunder with reference to the accompanying drawing in which.

DESCRIPTION OF THE PREFERRED EMBODIMENT

Figure 1:
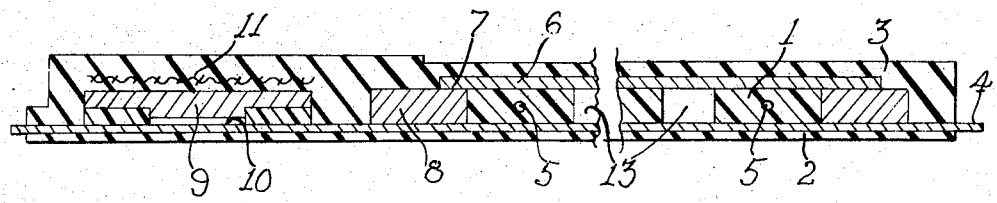
FIG. 1 is a sectional side view of the sensor pad or mat in accordance with the invention taken along line 1—1 of FIG. 3.
Figure 2:
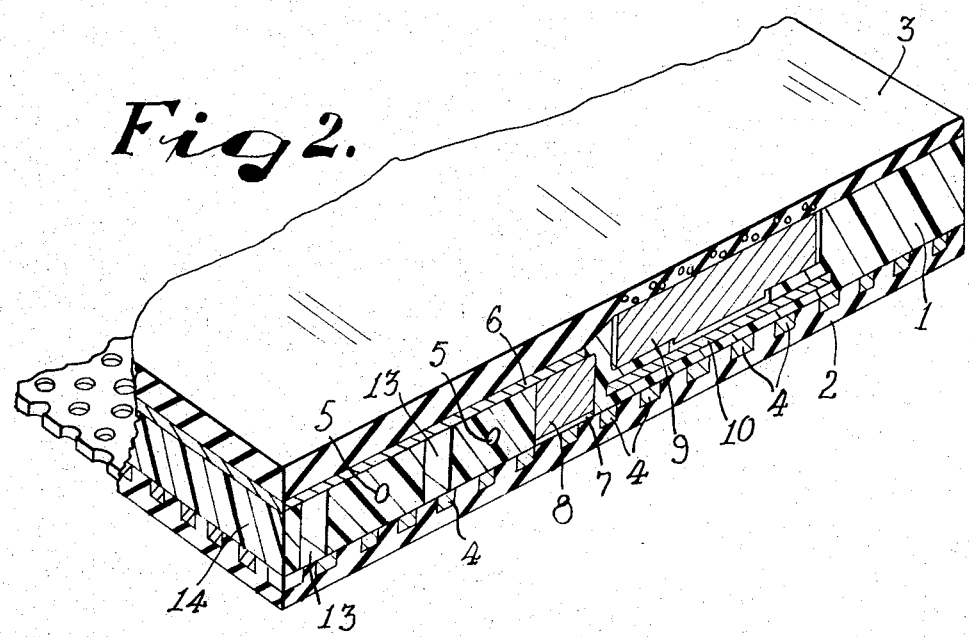
FIG. 2 is a perspective view, with parts broken away, taken on the line 2—2 of FIG. 3.

The sensor mat preferably is of a polychloroprene or material with similar properties and is formed of three distinct layers of this material. The central layer 1 is the more important one and is sandwiched between two protective layers 2 and 3 respectively. The shore hardness of the central layer is about 35° A while the protective layers have a hardness of approximately 60° A. A perforated steel plate 4 is provided between layers 1 and 2, the plate acting as the one electrode of the capacitor, bonding of layers 1 and 2 being effected through apertures in the plate 4. A second electrode is constituted by a series of threads of steel wire 5 the wire being embedded in the central layer 1 of the mat. Between the central layer 1 and the top protective layer 3 there is located a further electrode 6, the electrode being constituted by a layer of conducting material. Top and bottom electrodes 4 and 6 are coupled together at 7 and connected to earth through conducting bars 8. By so locating the electrodes, it is possible substantially to eliminate changes in the capacitance arising, for example, from the approach of a load.

Figure 3:
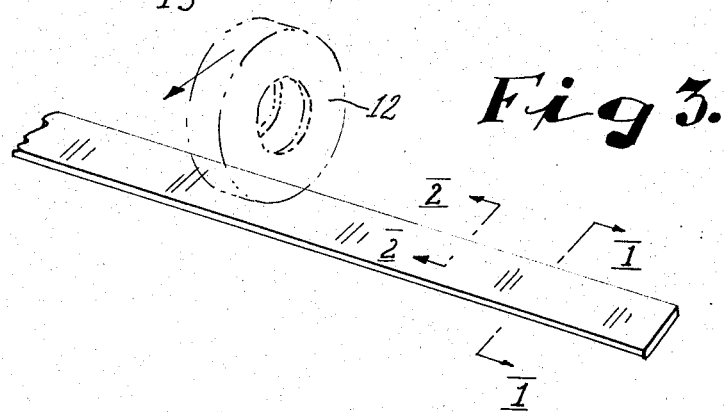
FIG. 3 is a perspective diagrammatic view illustrating a wheel passing over the sensor mat.

Switch means is provided for the mat, the switch being constituted by two plates 9 and 10 which are normally in open position, as shown in the drawings, and closed when a load is disposed above the switch. Above the plate 9 there is disposed a canvas reinforcing section 11 in the top layer 3 of the mat. In FIG. 3 of the drawings, a wheel 12 is diagrammatically shown moving over the mat.

When switch means 9 and 10 are operated, the mat is ready for service with the top two electrodes 5 and 6 spaced at the datum level of separation from the base electrode 4. On depression of the mat by the load, the spacing of the electrodes 4, 5 and 6 is varied and a signal is sent through to monitoring and translating equipment electrically coupled to the mat.

Immediately after the load passes, the central layer 1 of the mat which is the dielectric, acts automatically to restore the electrodes 4, 5 and 6 to the datum spacing level, ready for the next load.

The dielectric is constituted mainly by the central layer 1 of the mat and it is partly of material having an elastic nature so that after it is compressed by a load it assists in the restoration to its normal datum position. The remaining part of the dielectric is constituted by a medium which is highly compressible relative to the material constituting the elastic part of the dielectric.

In the illustrated examples of the invention this medium is constituted by voids or zones 13 formed in the central layer 1. These zones 13 preferably run in spaced parallel relationship along substantially the entire active length or width of the mat.

The air spaces or zones 13 constituting the voids may be formed as passages which are introduced by means of formers that may be extracted after or during manufacture of the dielectric layer 1. The spaces may be either longitudinally or transversely located in the mat and the cross-section may be of any suitable shape; for instance, the zones may be square, rectangular or round in cross-section, extending at least substantially between electrodes 4 and 6. The zones may be filled with a gas having particular properties to assist in the provision of the required sensitivity characteristics and compensate for changes of temperature of the mat, the over-riding requirement being that the mat should deform linearly relative to applied loads.

In the invention, reliance is placed for restoring the electrodes to the datum position solely on the elastic properties of the dielectric and this renders it possible to provide a unit which is in effect a relatively thin pad or mat. No obstruction is placed in the path of an oncoming vehicle and the mat is of such lightweight character that it may be moved with ease from locality to locality. The mat is fixed to the road surface without any excavation whatever thereto.

In an alternative form of the invention, the mat may be formed of polychloroprene or similar material of the same consistency or hardness for all of the layers 1, 2 and 3, but the preferred arrangement is as set out above.

Circumstances may exist where interference from an oncoming load is not of material consequence and, in these cases, resort may be had to an upper electrode which dispenses with the central element.

While prime importance is given to the mat in its use as a means for measuring axle weight of passing vehicles, the applicant envisages the invention as being used generally for the measuring of various types of transient or static loads.

What is claimed is:

1. A device for sensing and measuring a transient load imposed by at least one wheel on an axle of a passing vehicle, comprising:
    a resiliently flexible mat formed of a dielectric and elastomeric material and adapted to be engaged by the wheel,
    at least two vertically spaced capacitor electrodes embedded in and extending over substantially the entire operative area of the mat,
    means for connecting the electrodes to a device for detecting variations in the electrode spacing due to transient loads, and
    void areas located in the body of the mat to provide for mat deformation that is linearly proportional to the magnitude of an applied load, said void areas being uniformly distributed in the mat and extending at least substantially from one of said electrodes to the other.

2. The device claimed in claim 1 wherein said void areas are substantially parallel spaced passages passing through the mat with their principal axes in parallelism with an underlying road surface.

3. The device claimed in claim 2 wherein said passages are substantially straight ducts passing through the mat in a substantially lengthwise direction.

4. The device claimed in claim 1 wherein said electrodes include a base electrode, a central electrode and an overlying electrode, said electrodes being disposed in vertically spaced relationship relative to each other, and the base and overlying electrodes being coupled and adapted for earth connection, thereby to shield the central electrode.

5. The device claimed in claim 4 wherein the overlying electrode includes an element of conducting material having a resiliently flexible character.

6. The device claimed in claim 1 including switch means operable by a load to trigger the device into operation.

7. The device claimed in claim 6 wherein said switch means comprises two plates disposed within said mat, said plates normally being separated when there is no load on said mat, one of said plates being movable into contact with the other plate in response to a load on the mat.

* * * * *